US012781656B2

(12) United States Patent
Yu

(10) Patent No.: US 12,781,656 B2
(45) Date of Patent: Nov. 3, 2026

(54) DUAL SCR SYSTEM AND CONTROL METHOD THEREOF

(71) Applicant: HD CONSTRUCTION EQUIPMENT CO., LTD., Seongnam-si (KR)

(72) Inventor: Jin Hwan Yu, Incheon (KR)

(73) Assignee: HD CONSTRUCTION EQUIPMENT CO., LTD., Seongnam-si (KR)

( * ) Notice: Subject to any disclaimer, the term of this patent is extended or adjusted under 35 U.S.C. 154(b) by 0 days.

(21) Appl. No.: 19/337,123

(22) Filed: Sep. 23, 2025

(65) Prior Publication Data

US 2026/0092548 A1 Apr. 2, 2026

(30) Foreign Application Priority Data

Sep. 30, 2024 (KR) ........................ 10-2024-0132991

(51) Int. Cl.
*F01N 3/20* (2006.01)
*B01D 46/84* (2022.01)
(Continued)

(52) U.S. Cl.
CPC ............. *F01N 3/208* (2013.01); *B01D 46/84* (2022.01); *B01D 53/9418* (2013.01); *B01D 53/9431* (2013.01); *B01D 53/9477* (2013.01); *B01D 53/9495* (2013.01); *F01N 3/035* (2013.01); *F02M 26/15* (2016.02); *F02M 26/16* (2016.02); *B01D 2251/2062* (2013.01); *B01D 2251/2067* (2013.01); *B01D 2257/404* (2013.01);
(Continued)

(58) Field of Classification Search
CPC ............. F02D 41/0072; F02D 41/0235; F02D 2009/0223; F02D 2200/10; F02D 2200/1002; F02D 2200/1004; F02D 2200/101
See application file for complete search history.

(56) References Cited

U.S. PATENT DOCUMENTS

2007/0079605 A1* 4/2007 Hu ........................ F01N 3/0842 477/107
2011/0203259 A1* 8/2011 Upadhyay ............... F01N 3/208 60/274
(Continued)

OTHER PUBLICATIONS

The extended European search report dated Jan. 19, 2026 for the corresponding European Patent Application No. 25204856.6 (7 pages).

*Primary Examiner* — Binh Q Tran
(74) *Attorney, Agent, or Firm* — Hauptman Ham, LLP

(57) ABSTRACT

According to an embodiment of the disclosure, there is provided a dual selective catalytic reduction (SCR) system including: a first SCR device provided downstream of an engine; a diesel particulate filter provided downstream of the first SCR device; a second SCR device provided downstream of the diesel particulate filter; and a controller including a first SCR efficiency determination unit to determine a first reduction efficiency of the first SCR device, wherein the first SCR efficiency determination unit calculates a first-1 reduction efficiency for maximizing passive regeneration of the diesel particulate filter, calculates a first-2 reduction efficiency for minimizing nitrogen oxides, and calculates a first-3 reduction efficiency which is a value between the first-1 reduction efficiency and the first-2 reduction efficiency according to coolant temperatures of the engine.

20 Claims, 4 Drawing Sheets

(51) Int. Cl.

| | |
|---|---|
| ***B01D 53/94*** | (2006.01) |
| ***F01N 3/035*** | (2006.01) |
| ***F02D 9/02*** | (2006.01) |
| ***F02M 26/15*** | (2016.01) |
| ***F02M 26/16*** | (2016.01) |

(52) U.S. Cl.

CPC .... *B01D 2258/012* (2013.01); *B01D 2279/30* (2013.01); *F01N 3/206* (2013.01); *F01N 2900/0406* (2013.01); *F01N 2900/0408* (2013.01); *F01N 2900/08* (2013.01); *F01N 2900/1402* (2013.01); *F01N 2900/1621* (2013.01); *F02D 2009/0223* (2013.01); *F02D 2200/10* (2013.01); *F02D 2200/1004* (2013.01)

(56) References Cited

U.S. PATENT DOCUMENTS

| | | | | |
|---|---|---|---|---|
| 2016/0230632 | A1 | 8/2016 | Smith et al. | |
| 2020/0332691 | A1* | 10/2020 | Soeger | F01N 3/208 |
| 2022/0025805 | A1* | 1/2022 | Webb | F01N 13/009 |
| 2022/0162977 | A1 | 5/2022 | Hadl et al. | |
| 2022/0364488 | A1* | 11/2022 | Stoltz | B60L 1/02 |
| 2022/0412278 | A1* | 12/2022 | Volmerding | F01N 3/021 |
| 2023/0174050 | A1* | 6/2023 | McCarthy, Jr. | B01D 53/9418<br>701/22 |

* cited by examiner

DUAL SCR SYSTEM AND CONTROL METHOD THEREOF

CROSS REFERENCE TO RELATED APPLICATION

The present application claims priority to Korean Patent Application No. 10-2024-0132991, filed Sep. 30, 2024, the entire content of which is incorporated herein for all purposes by this reference.

BACKGROUND OF THE INVENTION

Field of the Invention

The disclosure relates to a dual selective catalytic reduction (SCR) system, which is optimized to minimize the fuel consumption of an engine and maximize the passive regeneration of a diesel particulate filter while meeting the required reduction in nitrogen oxides ($NO_x$), and a control method thereof.

Description of the Related Art

A selective catalytic reduction (SCR) system is an effective and practical system capable of meeting current and future $NO_x$ emission regulations. To comply with increasingly stringent $NO_x$ emission regulations, the application of a dual SCR system, which includes two SCR devices, is becoming essential. The dual SCR system typically includes two SCR devices such as a small-capacity upstream SCR device mounted close to an engine, and a large-capacity downstream SCR device mounted farther from the engine, thereby meeting the required $NO_x$ reduction efficiency. In this case, a strategy is required to optimally control each SCR device in the dual SCR system.

Documents of Related Art (Patent Document) US Patent Publication No. 2016-0230632 (Aug. 11, 2016)

SUMMARY OF THE INVENTION

An aspect of the disclosure is to provide a dual selective catalytic reduction (SCR) system optimized to minimize the fuel consumption of an engine and maximize the passive regeneration of a diesel particulate filter while meeting the required reduction in nitrogen oxides ($NO_x$), and a control method thereof.

The technical problems to be solved by the disclosure are not limited to those mentioned above, and other unmentioned technical problems will be clearly understood from the following descriptions by a person having ordinary knowledge in the art to which the disclosure pertains.

According to an embodiment of the disclosure, there is provided a dual selective catalytic reduction (SCR) system including: a first SCR device provided downstream of an engine; a diesel particulate filter provided downstream of the first SCR device; a second SCR device provided downstream of the diesel particulate filter; and a controller including a first SCR efficiency determination unit to determine a first reduction efficiency of the first SCR device, wherein the first SCR efficiency determination unit calculates a first-1 reduction efficiency for maximizing passive regeneration of the diesel particulate filter, calculates a first-2 reduction efficiency for minimizing nitrogen oxides, and calculates a first-3 reduction efficiency which is a value between the first-1 reduction efficiency and the first-2 reduction efficiency according to coolant temperatures of the engine.

According to an embodiment, the first-1 reduction efficiency may be calculated through a first-1 map based on engine torque and engine rotation speed, and the first-2 reduction efficiency may be calculated through a first-2 map based on the engine torque and the engine rotation speed.

According to an embodiment, the first-3 reduction efficiency may be calculated based on a first function, and the first function may be [First-3 reduction efficiency=First-1 reduction efficiency*r+First-2 reduction efficiency*(1−r)], where r is an interpolation ratio determined according to the coolant temperatures of the engine through a first-3 map.

According to an embodiment, the r may approach zero as the coolant temperature of the engine decreases.

According to an embodiment, the first SCR efficiency determination unit may calculate a maximum reduction efficiency through a first-4 map possible from a flow rate of nitrogen oxides flowing into the first SCR device and a temperature of engine exhaust gas flowing into the first SCR device, and compare the first-3 reduction efficiency with the maximum reduction efficiency to finally determine a lower one of the first-3 reduction efficiency and the maximum reduction efficiency as a first reduction efficiency.

According to an embodiment, the controller may further includes a second SCR efficiency determination unit to determine a second reduction efficiency of the second SCR device, and the second SCR efficiency determination unit may calculate a maximum reduction efficiency through a second-1 map possible from a flow rate of nitrogen oxides flowing into the second SCR device and a temperature of engine exhaust gas flowing into the second SCR device, and finally determine the maximum reduction efficiency as a second reduction efficiency.

According to an embodiment, the dual SCR system may further include: an exhaust gas recirculation (EGR) line that branches between the engine and the first SCR device to recirculate a portion of the engine exhaust gas back to the engine; and an EGR valve installed on the EGR line, wherein the controller further includes an EGR rate determination unit to determine an EGR rate of the engine exhaust gas recirculated to the engine.

According to an embodiment, the EGR rate determination unit may calculate a third-1 EGR rate for minimizing fuel consumption of the engine through a third-1 map, calculate a third-2 EGR rate for minimizing nitrogen oxides through a third-2 map, calculates a third-3 EGR rate which is a value between the third-1 EGR rate and the third-2 EGR rate based on the coolant temperature of the engine, and finally determine the third-3 EGR rate as the EGR rate.

According to an embodiment, the third-1 map and the third-2 map may be used to calculate the third-1 EGR rate and the third-2 EGR rate, respectively, based on engine torque and engine rotation speed.

According to an embodiment, the third-3 EGR rate may be calculated based on a second function, and the second function may be [Third-3 EGR rate=Third-1 EGR rate*r'+Third-2 EGR rate*(1−r')], where r' is an interpolation ratio determined according to the coolant temperature of the engine through a third-3 map.

According to an embodiment, the r' may approach zero as the coolant temperature of the engine decreases.

According to an embodiment of the disclosure, there is provided a control method of a dual selective catalytic reduction (SCR) system including a first SCR device provided downstream of an engine, a diesel particulate filter provided downstream of the first SCR device, a second SCR device provided downstream of the diesel particulate filter, the control method including: a first SCR efficiency determination step of determining a first reduction efficiency of the first SCR device, wherein the first SCR efficiency determination step includes calculating a first-1 reduction efficiency for maximizing passive regeneration of the diesel particulate filter, calculating a first-2 reduction efficiency for minimizing nitrogen oxides, and calculates a first-3 reduction efficiency which is a value between the first-1 reduction efficiency and the first-2 reduction efficiency according to coolant temperatures of the engine.

According to an embodiment, the first-1 reduction efficiency may be calculated through a first-1 map based on engine torque and engine rotation speed, and the first-2 reduction efficiency may be calculated through a first-2 map based on the engine torque and the engine rotation speed.

According to an embodiment, the first-3 reduction efficiency may be calculated based on a first function, and the first function may be [First-3 reduction efficiency=First-1 reduction efficiency*r+First-2 reduction efficiency*(1−r)], where r is an interpolation ratio determined according to the coolant temperatures of the engine through a first-3 map.

According to an embodiment, the first SCR efficiency determination step may include calculating a maximum reduction efficiency through a first-4 map possible from a flow rate of nitrogen oxides flowing into the first SCR device and a temperature of engine exhaust gas flowing into the first SCR device, and comparing the first-3 reduction efficiency with the maximum reduction efficiency to finally determine a lower one of the first-3 reduction efficiency and the maximum reduction efficiency as a first reduction efficiency.

According to an embodiment, the control method may further include a second SCR efficiency determination step of determining a second reduction efficiency of the second SCR device, wherein the second SCR efficiency determination step includes calculating a maximum reduction efficiency through a second-1 map possible from a flow rate of nitrogen oxides flowing into the second SCR device and a temperature of engine exhaust gas flowing into the second SCR device, and finally determining the maximum reduction efficiency as a second reduction efficiency.

According to an embodiment, the control method may further include an EGR rate determination step of determining an exhaust gas recirculation (EGR) rate of engine exhaust gas branched between the engine and the first SCR device and recirculated to the engine.

According to an embodiment, the EGR rate determination step may include calculating a third-1 EGR rate for minimizing fuel consumption of the engine through a third-1 map, calculating a third-2 EGR rate for minimizing nitrogen oxides through a third-2 map, calculating a third-3 EGR rate which is a value between the third-1 EGR rate and the third-2 EGR rate based on the coolant temperature of the engine, and finally determining the third-3 EGR rate as the EGR rate.

According to an embodiment, the third-1 map and the third-2 map may be used to calculate the third-1 EGR rate and the third-2 EGR rate, respectively, based on engine torque and engine rotation speed.

According to an embodiment, the third-3 EGR rate may be calculated based on a second function, and the second function may be [Third-3 EGR rate=Third-1 EGR rate*r'+Third-2 EGR rate*(1−r')], where r' is an interpolation ratio determined according to the coolant temperature of the engine through a third-3 map.

DETAILED DESCRIPTION OF THE INVENTION

Figure 1:
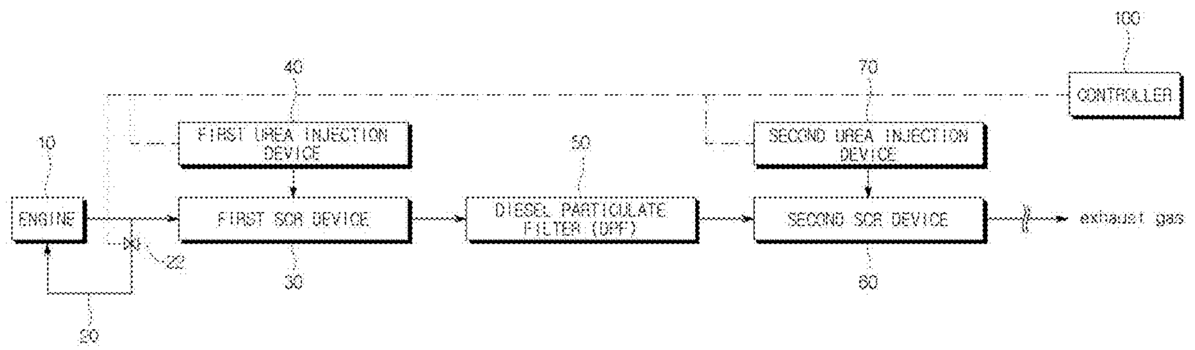
FIG. 1 is a schematic diagram illustrating a dual selective catalytic reduction (SCR) system according to an embodiment of the disclosure.
Figure 2:
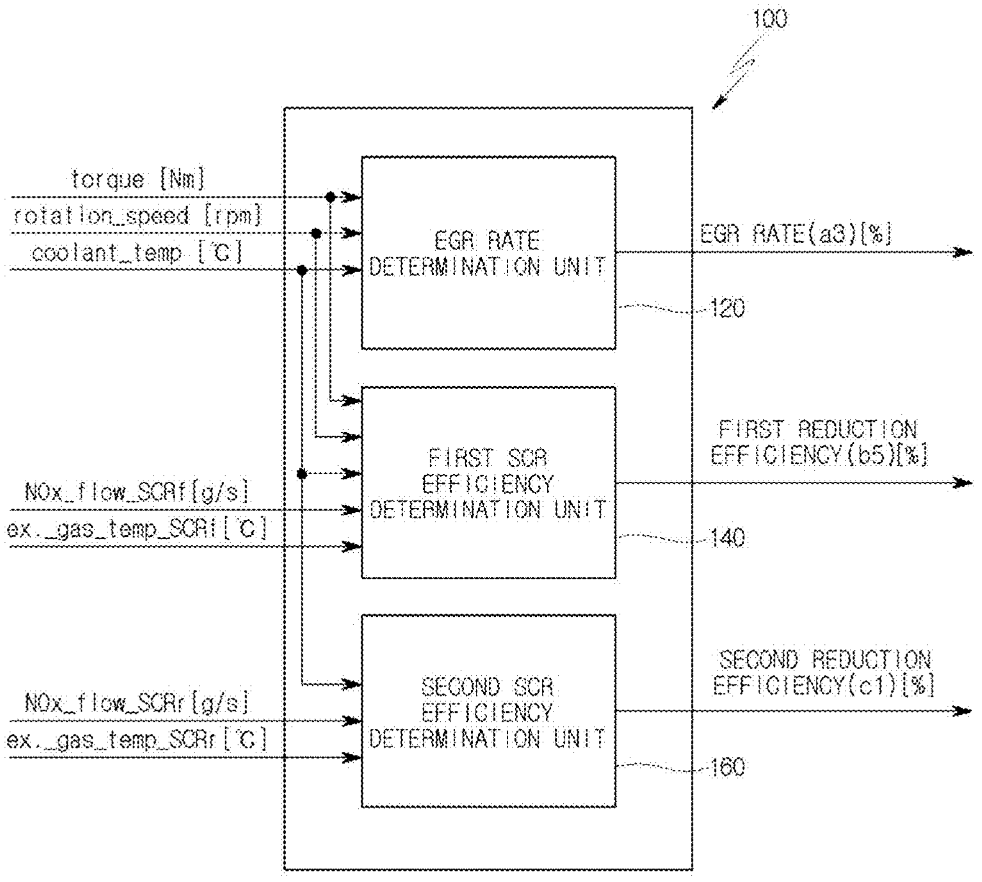
FIG. 2 is a detailed diagram illustrating a controller of FIG. 1.

Below, exemplary embodiments of a dual selective catalytic reduction (SCR) system and a control method thereof and apparatus for removing radionuclides from radioactive metal waste according to the disclosure will be described with reference to the accompanying drawings.

In addition, the terms described below are terms defined in consideration of functions in the disclosure, and these terms may vary with the intention or practice of a user or an operator. The following embodiments are not intended to limit the scope of the disclosure but are merely for the purpose of describing the components set forth in the appended claims.

For clear description of the disclosure, parts irrelevant to the description are omitted, and the same reference numerals refer to identical or similar components throughout the specification. In the whole specification, it will be understood that when a component is referred to as “including” any component, it does not exclude other components but may further include the other components unless otherwise specified.

Regarding an element with a suffix such as ‘unit’, two or more elements may be combined into one element, or one element may be divided into two or more elements according to functions. In addition, each of respective elements to be described below may additionally perform some or all functions among functions which other elements take charge of in addition to a primary function which each element takes charge of and some functions among primary functions which the respective elements take charge of may be exclusively performed by other elements.

First, a dual SCR system according to an embodiment of the disclosure will be described briefly with reference to FIG. 1.

The dual SCR system according to the disclosure may include an engine 10, an exhaust gas recirculation (EGR) line 20, an EGR valve 22, a first SCR device 30, a first urea injection device 40, a diesel particulate filter (DPF) 50, a second SCR device 60, a second urea injection device 70 and a controller 100.

The first SCR device 30 is provided downstream of the engine 10, and engine exhaust gas discharged from the engine 10 flows into the first SCR device 30. The diesel particulate filter 50 is provided downstream of the first SCR device 30, and the engine exhaust gas that has passed through the first SCR device 30 flows into the diesel particulate filter 50. The second SCR device 60 is provided downstream of the diesel particulate filter 50, and the engine exhaust gas that has passed through the diesel particulate filter 50 flows into the second SCR device 60.

In the first and second SCR devices 30 and 60, urea (aqueous ammonia solution) is injected into the engine exhaust gas through the first and second urea injection devices 40 and 70, respectively. Accordingly, in the first and second SCR devices 30 and 60, nitrogen oxides ($NO_x$) in the engine exhaust gas react with ammonia through a catalytic reaction and are converted into water ($H_2O$) and nitrogen ($N_2$).

The diesel particulate filter 50 captures fine soot particles PM in the engine exhaust gas, and then the collected particles PM are re-burned and removed. In this case, the process of burning and removing the fine soot particles ($C+NO_2 \rightarrow CO_2+NO$) will be referred to as passive regeneration.

The EGR line 20 branches between the engine 10 and the first SCR device 30 to recirculate a portion of the engine exhaust gas back to the engine 10, and the EGR valve 22 is installed on the EGR line 20 to control the amount of engine exhaust gas recirculated to the engine 10. By recirculating a portion of the engine exhaust gas combusted in the engine 10 back to the engine 10, the combustion temperature can be lowered, thereby inducing suppression of nitrogen oxides. However, various residues accumulate in intake and combustion chambers during the recirculation process, and thus an increased EGR rate of the engine exhaust gas recirculated to the engine 10 may decrease combustion efficiency, resulting in degradation in the fuel efficiency and performance of the engine.

According to the disclosure, the controller 100 is provided to determine the EGR rate of the engine exhaust gas recirculated to the engine 10, the first reduction efficiency of the first SCR device 30, and the second reduction efficiency of the second SCR device 60, respectively. The controller 100 determines the EGR rate, the first reduction efficiency and the second reduction efficiency, which are optimized to minimize the fuel consumption of the engine 10 and maximize the passive regeneration of the diesel particulate filter 50 while meeting the required reduction in nitrogen oxides ($NO_x$). The controller 100 may control the EGR valve 22, the first urea injection device 40, and the second urea injection device 70 based on the determined EGR rate, first reduction efficiency, and second reduction efficiency.

Below, the controller 100 will be described in detail with reference to FIGS. 2 to 5.

The controller 100 generally includes an EGR rate determination unit 120 that determines the EGR rate of the engine exhaust gas recirculated to the engine 10, a first SCR efficiency determination unit 140 that determines the first reduction efficiency of the first SCR device 30, and a second SCR efficiency determination unit 160 that determines the second reduction efficiency of the second SCR device 60.

The EGR rate determination unit 120 is configured to receive an engine torque (torque), an engine rotation speed (rotation_speed), and an engine coolant temperature (coolant_temp) as input values, calculate an optimal EGR rate a3, and output the optimal EGR rate a3 as an output value. The first SCR efficiency determination unit 140 is configured to receive an engine torque, an engine rotation speed, an engine coolant temperature, a flow rate of nitrogen oxides flowing into the first SCR device 30 ($NO_x$_flow_SCRf), and a temperature of the engine exhaust gas flowing into the first SCR device 30 (ex_gas_temp_SCRf) as input values, calculate an optimal first reduction efficiency b5, and output the optimal first reduction efficiency b5 as an output value. The second SCR efficiency determination unit 160 receives a flow rate of nitrogen oxides flowing into the second SCR device 60 ($NO_x$_flow_SCRr) and a temperature of the engine exhaust gas flowing into the second SCR device 60 (ex_gas_temp_SCRr) as input values, calculates an optimal second reduction efficiency c1, and output the optimal second reduction efficiency c1 as an output value.

The foregoing input values are transmitted in real time to the EGR rate determination unit 120, the first SCR efficiency determination unit 140, and the second SCR efficiency determination unit 160, respectively, and thus the optimal output values are also calculated in real time.

Figure 3:
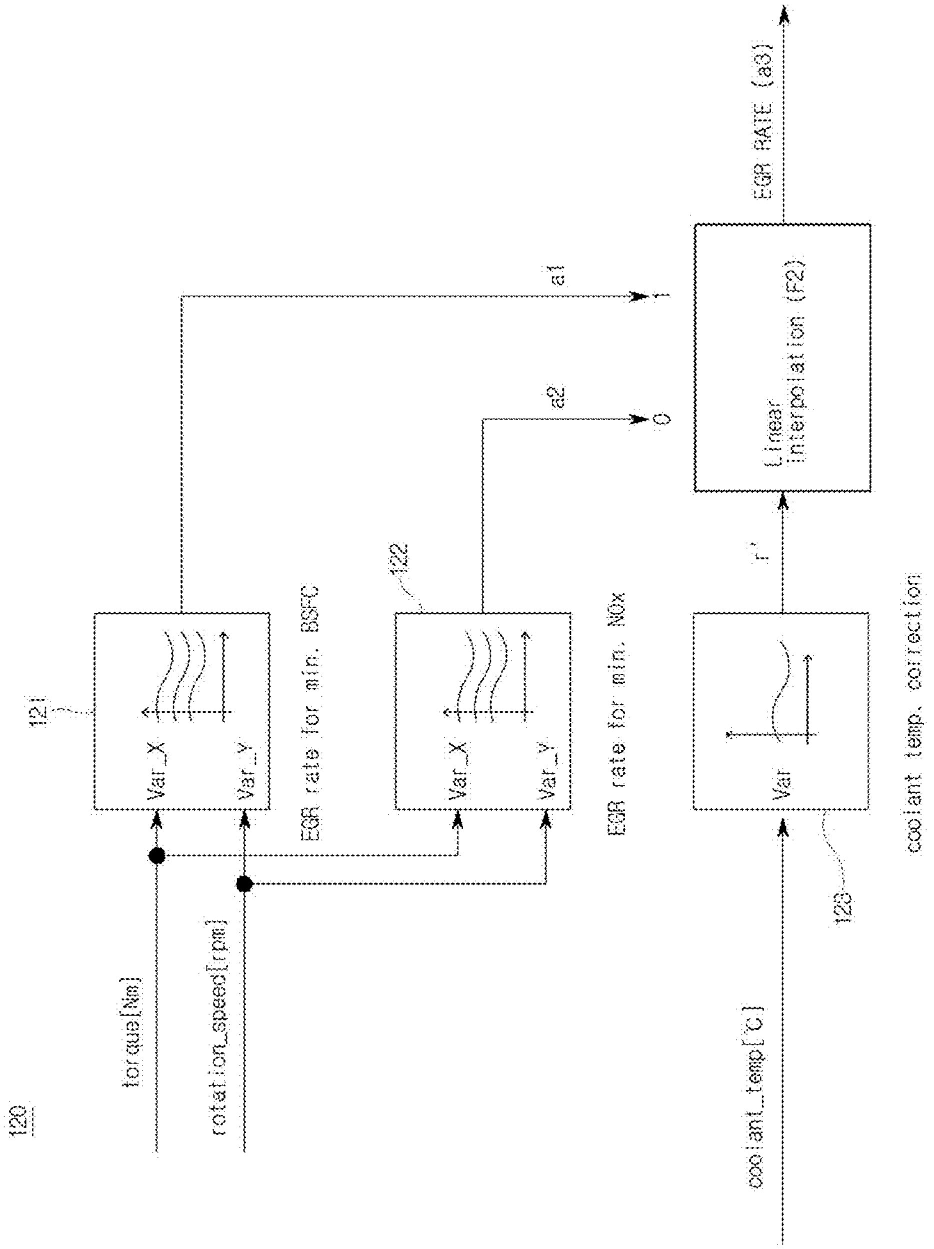
FIG. 3 is a detailed diagram illustrating an EGR rate determination unit of FIG. 2.

Detailed descriptions about the EGR rate determination unit 120 will be described with reference to FIG. 3. The EGR rate determination unit 120 calculates a third-1 EGR rate a1 for minimizing the fuel consumption of the engine 10 (i.e., maximizing the fuel efficiency) through a third-1 map 121, and calculates a third-2 EGR rate a2 for minimizing nitrogen oxides through a third-2 map 122. In this case, the third-1 map 121 and the third-2 map 122 are used to calculate the third-1 EGR rate a1 and the third-2 EGR rate a2, respectively, based on the engine torque and the engine rotation speed. In other words, the respective EGR rates for minimizing the fuel consumption at the engine torques and the engine rotation speeds may be pre-mapped in the third-1 map 121, and the respective EGR rates for minimizing nitrogen oxide at the engine torques and the engine rotation speeds may be pre-mapped in the third-2 map 122.

Subsequently, a third-3 EGR rate a3 which is a value between the third-1 EGR rate a1 and the third-2 EGR rate a2, may be calculated based on a coolant temperature of the engine, and the third-3 EGR rate a3 may be finally determined as an EGR rate.

Specifically, the third-3 EGR rate a3 is calculated based on a second function F2. The third-1 EGR rate a1 and the third-2 EGR rate a2 are input to the second function F2 for linear interpolation. The second function F2 is [Third-3 EGR rate a3=Third-1 EGR rate a1*r'+Third-2 EGR rate a2*(1−r')], where r' is an interpolation ratio determined according to the engine coolant temperature through the third-3 map 123. Accordingly, if r' is 0, the third-3 EGR rate a3 is determined as the third-2 EGR rate a2, and if r' is 1, the third-3 EGR rate a3 is determined as the third-1 EGR rate a1.

In this case, r' may be set to approach zero as the engine coolant temperature decreases. When the engine coolant temperature is low, the first and second SCR devices 30 and 60 cannot properly perform their nitrogen oxide reduction functions, and it is thus more important to minimize nitrogen oxides by reducing nitrogen oxides as much as possible rather than minimizing the fuel consumption of the engine 10. In other words, when the engine coolant temperature is low, it is necessary to recirculate the engine exhaust gas at a higher EGR rate. On the other hand, when the engine coolant temperature is high, the first and second SCR devices 30 and 60 can sufficiently perform their nitrogen oxide reduction functions, and it is thus more important to minimize the fuel consumption of the engine 10 than to reduce nitrogen oxides as much as possible in an EGR stage. In other words, when the engine coolant temperature is high, it is necessary to improve the fuel efficiency by recirculating the engine exhaust gas at an EGR rate optimized for the fuel efficiency.

In particular, a high temperature is required to activate catalysts in the first and second SCR devices 30 and 60. However, in the initial stage of engine start-up, the first and second SCR devices 30 and 60 do not function sufficiently, and therefore there is a great need to reduce nitrogen oxides through the EGR stage.

For example, on the assumption that the engine coolant temperature varies within a range of 30° C. to 80° C., the third-2 EGR rate a2 calculated from the third-2 map 122 may be directly applied when the coolant temperature is 30° C. or lower, and the third-1 EGR rate a1 calculated from the third-1 map 121 may be directly applied when the coolant temperature is 80° C. or higher. In addition, when the coolant temperature is 55° C., a value between the third-1 EGR rate a1 and the third-2 EGR rate a2 may be applied according to an optimal ratio value mapped in the third-3 map 123.

As a result, the EGR rate a3, at which the fuel efficiency and nitrogen oxide level are optimized according to the engine torque, the engine rotation speed, and the engine coolant temperature, is output.

Figure 4:
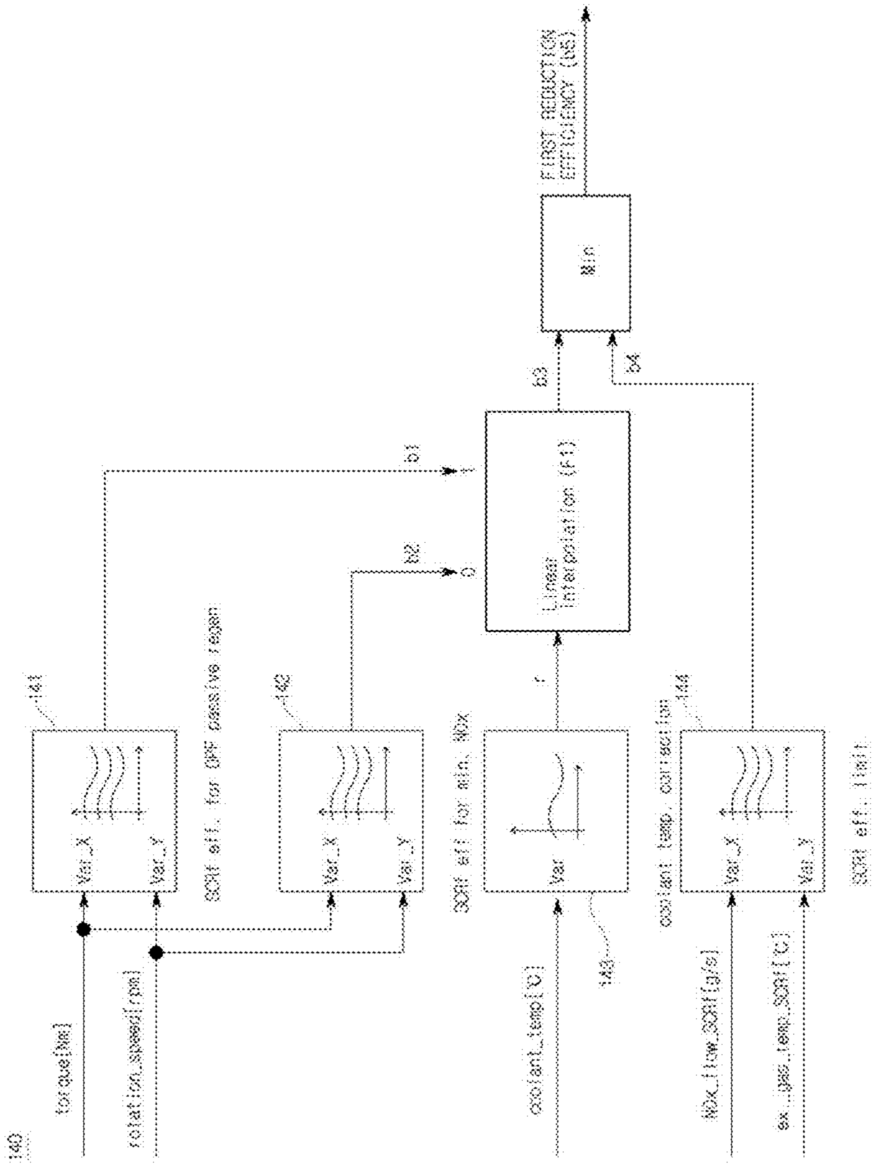
FIG. 4 is a detailed diagram illustrating a first SCR efficiency determination unit of FIG. 2.

Next, the first SCR efficiency determination unit 140 will be described in detail with reference to FIG. 4. The first SCR efficiency determination unit 140 calculates a first-1 reduction efficiency b1 for maximizing the passive regeneration of the diesel particulate filter 50 through a first-1 map 141, and calculates a first-2 reduction efficiency b2 for minimizing nitrogen oxides through a first-2 map 142. In this case, the first-1 map 141 and the first-2 map 142 are used to calculate the first-1 reduction efficiency b1 and the first-2 reduction efficiency b2, respectively, based on the engine torque and the engine rotation speed. In other words, the respective reduction efficiencies for maximizing the passive regeneration of the diesel particulate filter 50 at the engine torques and the engine rotation speeds may be pre-mapped in the first-1 map 141, and the respective reduction efficiencies for minimizing nitrogen oxides at the engine torques and the engine rotation speeds may be pre-mapped in the first-2 map 142.

Subsequently, a first-3 reduction efficiency b3 which is a value between the first-1 reduction efficiency b1 and the first-2 reduction efficiency b2, is calculated according to the engine coolant temperatures. Specifically, the first-3 reduction efficiency b3 is calculated based on a first function F1. The first-1 reduction efficiency b1 and the first-2 reduction efficiency b2 are input to the first function F1 for linear interpolation. The first function F1 is [First-3 reduction efficiency b3=First-1 reduction efficiency b1*r+First-2 reduction efficiency b2*(1−r)], where r is an interpolation ratio determined according to the engine coolant temperature through a first-3 map 143. Accordingly, if r is 0, the first-3 reduction efficiency b3 is determined as the first-2 reduction efficiency b2, and if r is 1, the first-3 reduction efficiency b3 is determined as the first-1 reduction efficiency b1.

In this case, r may be set to approach zero as the engine coolant temperature decreases. When the engine coolant temperature is low, the second SCR device 60 relatively farther away from the engine cannot sufficiently perform its nitrogen oxide reduction function, and it is thus more important to minimize nitrogen oxides flowing to the second SCR device 60 by reducing nitrogen oxides as much as possible rather than maximizing the passive regeneration of the diesel particulate filter 50. In other words, when the engine coolant temperature is low, it is necessary to reduce nitrogen oxide at a higher first SCR efficiency. On the other hand, when the engine's coolant temperature is high, the second SCR device 60 can sufficiently perform its nitrogen oxide reduction function, and it is thus more important to maximize the passive regeneration of the diesel particulate filter 50 than to reduce nitrogen oxides as much as possible in the first SCR device 30. In other words, when the engine coolant temperature is high, it is necessary to reduce only the minimum amount of nitrogen oxides at a lower first SCR efficiency and to flow the remaining nitrogen oxides to the diesel particulate filter 50. This is because, as described above, $NO_2$ is required for the passive regeneration of the diesel particulate filter 50 ($C+NO_2 \rightarrow CO_2+NO$).

Subsequently, the first SCR efficiency determination unit 140 calculates a maximum reduction efficiency b4 through a first-4 map 144 possible from the flow rate of nitrogen oxides flowing into the first SCR device 30 and the temperature of the engine exhaust gas flowing into the first SCR device 30. In this case, the intrinsic catalytic capacity of the first SCR device 30 and the activation level of the catalyst depending on the temperature of the engine exhaust gas may be taken into account. Finally, the first SCR efficiency determination unit 140 may compare the first-3 reduction efficiency b3 with the maximum reduction efficiency b4 and finally determine the lower one between them as a first reduction efficiency b5. In other words, when the first-3 reduction efficiency b3 is lower than the maximum reduction efficiency b4, the first-3 reduction efficiency b3 will be determined as the final first reduction efficiency b5. On the other hand, when the maximum reduction efficiency b4 is lower than the first-3 reduction efficiency b3, the maximum reduction efficiency b4 will be determined as the final first reduction efficiency b5.

As a result, the first reduction efficiency b5, at which the passive regeneration of the diesel particulate filter 50 and nitrogen oxide level are optimized according to the engine torque, the engine rotation speed, the engine coolant temperature, the flow rate of nitrogen oxides flowing into the first SCR device 30, and the temperature of the engine exhaust gas flowing into the first SCR device 30, is output.

Figure 5:
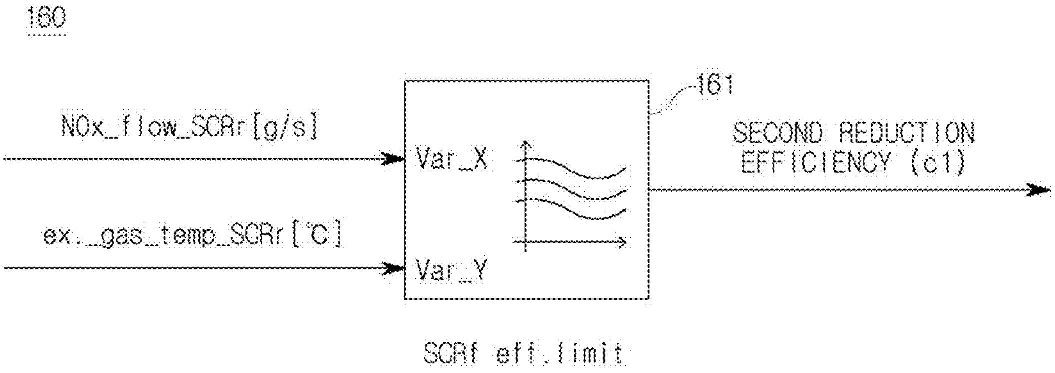
FIG. 5 is a detailed diagram illustrating a second SCR efficiency determination unit of FIG. 2.

Next, the second SCR efficiency determination unit 160 will be described in detail with reference to FIG. 5. The second SCR efficiency determination unit 160 calculates a maximum reduction efficiency c1 through the second-1 map 161 possible from the flow rate of nitrogen oxides flowing into the second SCR device 60 and the temperature of the engine exhaust gas flowing into the second SCR device 60, and ultimately determines the maximum reduction efficiency c1 as a second reduction efficiency. In this case, the intrinsic catalytic capacity of the second SCR device 60 and the activation level of the catalyst according to the temperature of the engine exhaust gas may be taken into account.

Accordingly, the second SCR device 60 operates at the maximum reduction efficiency to reduce nitrogen oxides as much as possible, while the first SCR device 30 reduces the remaining nitrogen oxides that the second SCR device 60 cannot treat considering that the second SCR device 60 reduces nitrogen oxides as much as possible.

Figure 6:
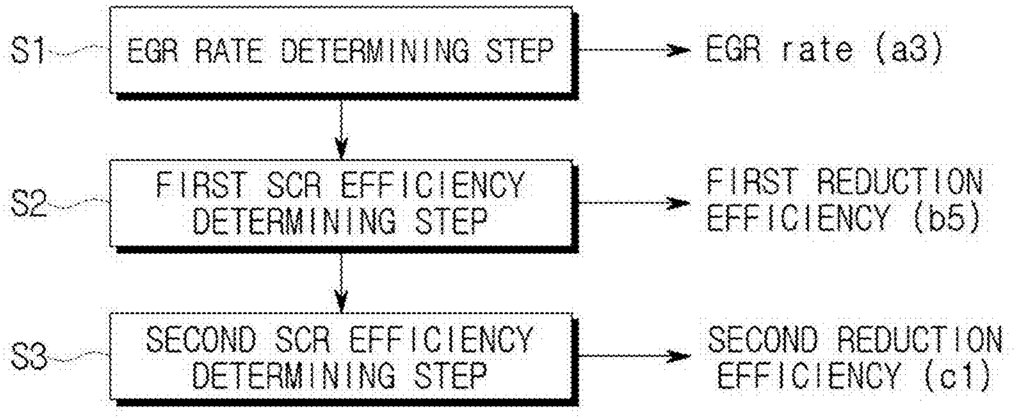
FIG. 6 is a schematic flowchart illustrating a control method of a dual SCR system according to an embodiment of the disclosure.

Finally, a control method of the dual SCR system according to an embodiment of the disclosure will be described with reference to FIG. 6.

The control method of the dual SCR system according to the disclosure may include an EGR rate determining step S1 of determining the EGR rate a3 of the engine exhaust gas that is branched between the engine 10 and the first SCR device 30 and recirculated to the engine 10, a first SCR efficiency determining step S2 of determining the first reduction efficiency b5 of the first SCR device 30, and a second SCR efficiency determining step S3 of determining the second reduction efficiency c1 of the second SCR device 60. Although FIG. 6 illustrates steps S1 to S3 as being performed sequentially, the steps may be reordered or performed simultaneously depending on the embodiments.

The EGR rate determination step S1 is the same as that performed by the foregoing EGR rate determination unit 120 to determine the EGR rate a3, the first SCR efficiency determination step S2 is the same as that performed by the foregoing first SCR efficiency determination unit 140 to determine the first reduction efficiency b5, and the second SCR efficiency determination step S3 is the same as that performed by the second SCR efficiency determination unit 160 to determine the second reduction efficiency c1. Thus, repetitive descriptions thereof will be avoided.

The disclosure is not limited to the specific embodiments and descriptions described above, and various modifications can be made by a person having ordinary knowledge in the art, to which the disclosure pertains, without departing from the gist of the disclosure as claimed in the claims, and such modifications fall within the scope of the disclosure.

According to the disclosure, the EGR rate and the reduction efficiency of each SCR device are optimized to minimize the fuel consumption of the engine and maximize the passive regeneration of the diesel particulate filter while meeting the required reduction in nitrogen oxides ($NO_x$). This allows for the design of a dual SCR system optimized for environmental and operating conditions while meeting $NO_x$ emission regulations, and minimizing operating costs.

The effects of the disclosure are not limited to those mentioned above, and it should be understood that the effects of the disclosure include all effects inferable from the foregoing detailed description or the appended claims.

DESCRIPTION OF REFERENCE NUMERALS

10: engine
20: EGR line
22: EGR valve
30: first SCR device
40: first urea injection device
50: diesel particulate filter
60: second SCR device
70: second urea injection device
100: controller
120: EGR rate determination unit
121: third-1 map
122: third-2 map
123: third-3 map
140: first SCR efficiency determination unit
141: first-1 map
142: first-2 map
143: first-3 map
144: first-4 map
160: second SCR efficiency determination unit
161: second-1 map

What is claimed is:

1. A dual selective catalytic reduction (SCR) system comprising:
a first SCR device provided downstream of an engine;
a diesel particulate filter provided downstream of the first SCR device;
a second SCR device provided downstream of the diesel particulate filter; and
a controller comprising a first SCR efficiency determination unit to determine a first reduction efficiency of the first SCR device,
wherein the first SCR efficiency determination unit calculates a first-1 reduction efficiency for maximizing passive regeneration of the diesel particulate filter, calculates a first-2 reduction efficiency for minimizing nitrogen oxides, and calculates a first-3 reduction efficiency which is a value between the first-1 reduction efficiency and the first-2 reduction efficiency according to coolant temperatures of the engine.

2. The dual SCR system of claim 1, wherein the first-1 reduction efficiency is calculated through a first-1 map based on engine torque and engine rotation speed, and the first-2 reduction efficiency is calculated through a first-2 map based on the engine torque and the engine rotation speed.

3. The dual SCR system of claim 1, wherein
the first-3 reduction efficiency is calculated based on a first function, and
the first function is [First-3 reduction efficiency=First-1 reduction efficiency*r+First-2 reduction efficiency*(1−r)], where r is an interpolation ratio determined according to the coolant temperatures of the engine through a first-3 map.

4. The dual SCR system of claim 3, wherein the r approaches zero as the coolant temperature of the engine decreases.

5. The dual SCR system of claim 1, wherein the first SCR efficiency determination unit calculates a maximum reduction efficiency through a first-4 map possible from a flow rate of nitrogen oxides flowing into the first SCR device and a temperature of engine exhaust gas flowing into the first SCR device, and compares the first-3 reduction efficiency with the maximum reduction efficiency to finally determine a lower one of the first-3 reduction efficiency and the maximum reduction efficiency as a first reduction efficiency.

6. The dual SCR system of claim 1, wherein
the controller further comprises a second SCR efficiency determination unit to determine a second reduction efficiency of the second SCR device, and
the second SCR efficiency determination unit calculates a maximum reduction efficiency through a second-1 map possible from a flow rate of nitrogen oxides flowing into the second SCR device and a temperature of engine exhaust gas flowing into the second SCR device, and finally determines the maximum reduction efficiency as a second reduction efficiency.

7. The dual SCR system of claim 1, further comprising:
an exhaust gas recirculation (EGR) line that branches between the engine and the first SCR device to recirculate a portion of the engine exhaust gas back to the engine; and
an EGR valve installed on the EGR line,
wherein the controller further comprises an EGR rate determination unit to determine an EGR rate of the engine exhaust gas recirculated to the engine.

8. The dual SCR system of claim 7, wherein the EGR rate determination unit calculates a third-1 EGR rate for minimizing fuel consumption of the engine through a third-1 map, calculates a third-2 EGR rate for minimizing nitrogen oxides through a third-2 map, calculates a third-3 EGR rate which is a value between the third-1 EGR rate and the third-2 EGR rate based on the coolant temperature of the engine, and finally determines the third-3 EGR rate as the EGR rate.

9. The dual SCR system of claim 8, wherein the third-1 map and the third-2 map are used to calculate the third-1 EGR rate and the third-2 EGR rate, respectively, based on engine torque and engine rotation speed.

10. The dual SCR system of claim 8, wherein
the third-3 EGR rate is calculated based on a second function, and
the second function is [Third-3 EGR rate=Third-1 EGR rate*r'+Third-2 EGR rate*(1−r')], where r' is an interpolation ratio determined according to the coolant temperature of the engine through a third-3 map.

11. The dual SCR system of claim 10, wherein the r' approaches zero as the coolant temperature of the engine decreases.

12. A control method of a dual selective catalytic reduction (SCR) system comprising a first SCR device provided downstream of an engine, a diesel particulate filter provided downstream of the first SCR device, a second SCR device provided downstream of the diesel particulate filter, the control method comprising:

a first SCR efficiency determination step of determining a first reduction efficiency of the first SCR device, wherein the first SCR efficiency determination step comprises calculating a first-1 reduction efficiency for maximizing passive regeneration of the diesel particulate filter, calculating a first-2 reduction efficiency for minimizing nitrogen oxides, and calculates a first-3 reduction efficiency which is a value between the first-1 reduction efficiency and the first-2 reduction efficiency according to coolant temperatures of the engine.

13. The control method of claim 12, wherein the first-1 reduction efficiency is calculated through a first-1 map based on engine torque and engine rotation speed, and the first-2 reduction efficiency is calculated through a first-2 map based on the engine torque and the engine rotation speed.

14. The control method of claim 12, wherein the first-3 reduction efficiency is calculated based on a first function, and the first function is [First-3 reduction efficiency=First-1 reduction efficiency*r+First-2 reduction efficiency*(1−r)], where r is an interpolation ratio determined according to the coolant temperatures of the engine through a first-3 map.

15. The control method of claim 12, wherein the first SCR efficiency determination step comprises calculating a maximum reduction efficiency through a first-4 map possible from a flow rate of nitrogen oxides flowing into the first SCR device and a temperature of engine exhaust gas flowing into the first SCR device, and comparing the first-3 reduction efficiency with the maximum reduction efficiency to finally determine a lower one of the first-3 reduction efficiency and the maximum reduction efficiency as a first reduction efficiency.

16. The control method of claim 12, further comprising a second SCR efficiency determination step of determining a second reduction efficiency of the second SCR device, wherein the second SCR efficiency determination step comprises calculating a maximum reduction efficiency through a second-1 map possible from a flow rate of nitrogen oxides flowing into the second SCR device and a temperature of engine exhaust gas flowing into the second SCR device, and finally determining the maximum reduction efficiency as a second reduction efficiency.

17. The control method of claim 12, further comprising an EGR rate determination step of determining an exhaust gas recirculation (EGR) rate of engine exhaust gas branched between the engine and the first SCR device and recirculated to the engine.

18. The control method of claim 17, wherein the EGR rate determination step comprises calculating a third-1 EGR rate for minimizing fuel consumption of the engine through a third-1 map, calculating a third-2 EGR rate for minimizing nitrogen oxides through a third-2 map, calculating a third-3 EGR rate which is a value between the third-1 EGR rate and the third-2 EGR rate based on the coolant temperature of the engine, and finally determining the third-3 EGR rate as the EGR rate.

19. The control method of claim 18, wherein the third-1 map and the third-2 map are used to calculate the third-1 EGR rate and the third-2 EGR rate, respectively, based on engine torque and engine rotation speed.

20. The control method of claim 18, wherein the third-3 EGR rate is calculated based on a second function, and the second function is [Third-3 EGR rate=Third-1 EGR rate*r'+Third-2 EGR rate*(1−r')], where r' is an interpolation ratio determined according to the coolant temperature of the engine through a third-3 map.

* * * * *